United States Patent
Lee et al.

(10) Patent No.: US 10,536,234 B2
(45) Date of Patent: Jan. 14, 2020

(54) SYNCHRONIZATION SIGNAL TRANSMISSION METHOD FOR D2D COMMUNICATION IN WIRELESS COMMUNICATION SYSTEM, AND DEVICE THEREFOR

(71) Applicant: LG Electronics Inc., Seoul (KR)

(72) Inventors: Seungmin Lee, Seoul (KR); Hanbyul Seo, Seoul (KR)

(73) Assignee: LG Electronics Inc., Seoul (KR)

( * ) Notice: Subject to any disclaimer, the term of this patent is extended or adjusted under 35 U.S.C. 154(b) by 140 days.

(21) Appl. No.: 15/502,885

(22) PCT Filed: Aug. 13, 2015

(86) PCT No.: PCT/KR2015/008487
§ 371 (c)(1),
(2) Date: Feb. 9, 2017

(87) PCT Pub. No.: WO2016/024825
PCT Pub. Date: Feb. 18, 2016

(65) Prior Publication Data
US 2017/0237515 A1    Aug. 17, 2017

Related U.S. Application Data

(60) Provisional application No. 62/037,098, filed on Aug. 13, 2014.

(51) Int. Cl.
*H04J 11/00* (2006.01)
*H04W 56/00* (2009.01)
*H04W 76/14* (2018.01)

(52) U.S. Cl.
CPC .......... *H04J 11/0086* (2013.01); *H04J 11/00* (2013.01); *H04J 11/0073* (2013.01);
(Continued)

(58) Field of Classification Search
None
See application file for complete search history.

(56) References Cited

U.S. PATENT DOCUMENTS

| 2015/0181546 A1* | 6/2015 | Freda | H04W 56/0015 |
| | | | 370/336 |
| 2015/0215883 A1* | 7/2015 | Zheng | H04W 52/30 |
| | | | 455/426.1 |

(Continued)

FOREIGN PATENT DOCUMENTS

| KR | 1020100038441 A | 4/2010 |
| KR | 1020140084839 A | 7/2014 |

(Continued)

OTHER PUBLICATIONS

Samsung: "Resource allocation for synchronization signal to assist D2D discovery/communication in asynchronous network", 3GPP TSG RAN WG1 #78, R1-143097, Aug. 8-22, 2014.

(Continued)

*Primary Examiner* — Phirin Sam
*Assistant Examiner* — Faiyazkhan Ghafoerkhan
(74) *Attorney, Agent, or Firm* — Dentons US LLP

(57) ABSTRACT

The present invention relates to a method and a device for transmitting a device-to-device (D2D) synchronization signal of a first terminal in a wireless communication system. More specifically, the method comprises the steps of: setting at least one candidate value for a D2D synchronization signal period; and determining a D2D synchronization signal period for transmitting/receiving a D2D signal to/from a second terminal from among the at least one candidate value.

8 Claims, 12 Drawing Sheets

(52) U.S. Cl.
CPC ....... *H04W 56/00* (2013.01); *H04W 56/0015* (2013.01); *H04W 76/14* (2018.02); *H04J 2211/006* (2013.01)

(56) References Cited

U.S. PATENT DOCUMENTS

| | | | |
|---|---|---|---|
| 2016/0021625 A1* | 1/2016 | Li | H04W 72/1289 |
| | | | 370/336 |
| 2016/0021626 A1* | 1/2016 | Abedini | H04W 56/002 |
| | | | 370/328 |
| 2016/0044618 A1* | 2/2016 | Sheng | H04W 56/002 |
| | | | 370/329 |
| 2016/0095074 A1* | 3/2016 | Park | H04W 8/005 |
| | | | 370/350 |
| 2016/0149660 A1* | 5/2016 | Seo | H04W 76/14 |
| | | | 370/336 |
| 2016/0323836 A1* | 11/2016 | Park | H04W 52/243 |
| 2017/0041773 A1* | 2/2017 | Fujishiro | H04W 8/005 |
| 2017/0041932 A1* | 2/2017 | Chae | H04W 72/04 |
| 2017/0064660 A1* | 3/2017 | Chen | H04W 56/0025 |
| 2017/0064733 A1* | 3/2017 | Lee | H04W 76/14 |
| 2017/0079085 A1* | 3/2017 | Yang | H04W 72/02 |
| 2017/0099174 A1* | 4/2017 | Kim | H04W 76/14 |
| 2017/0265155 A1* | 9/2017 | Kim | H04W 88/02 |
| 2018/0077659 A9* | 3/2018 | Li | H04W 76/14 |

FOREIGN PATENT DOCUMENTS

| | | |
|---|---|---|
| KR | 100580834 B1 | 5/2016 |
| WO | 2014018333 A2 | 1/2014 |

OTHER PUBLICATIONS

LG Electronics: "Discussion on resource allocation for D2D synchronization", 3GPP TSG RAN WG1 Meeting #78, R1-143188, Aug. 18-22, 2014.

ZTE; "Resource Allocation for Synchronization Signal and Channel," 3GPP TSG-RAN WG1 #78, Aug. 18-22, 2014, R1-143141.

Ericsson; "Frame Structure for D2D-Enabled LTE Carriers and Resources Configuration," 3GPP TSG-RAN WG1 Meeting #78, Aug. 18-22, 2014, R1-143367.

* cited by examiner

FIG. 2
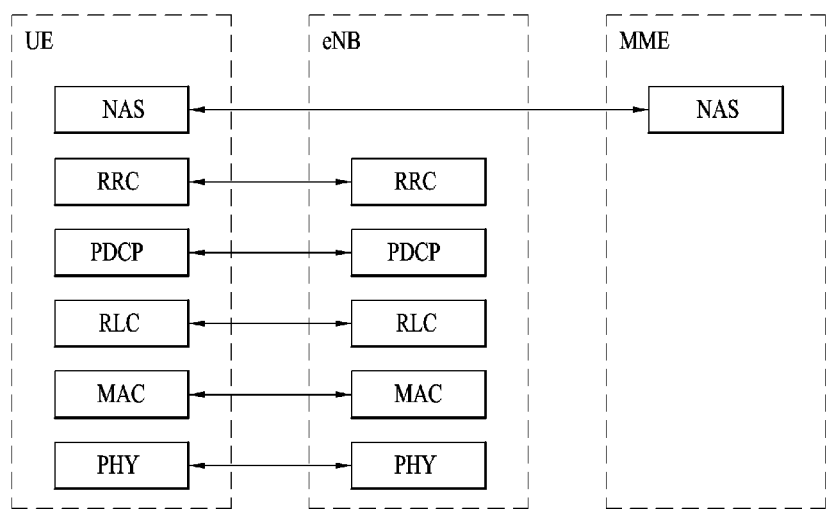
(a) Control-Plane Protocol Stack
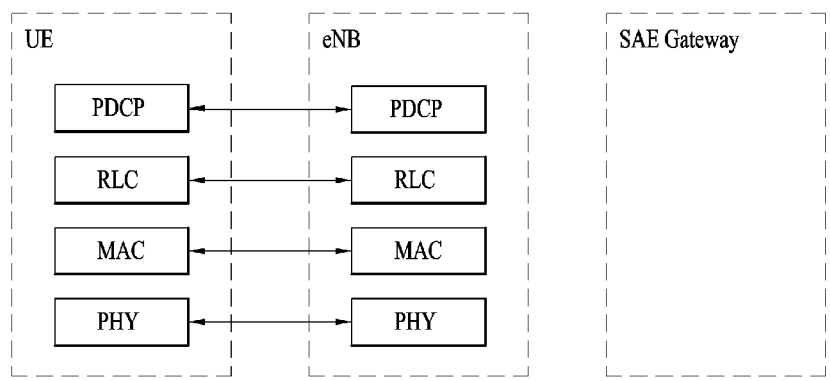
(b) User-Plane Protocol Stack

SYNCHRONIZATION SIGNAL TRANSMISSION METHOD FOR D2D COMMUNICATION IN WIRELESS COMMUNICATION SYSTEM, AND DEVICE THEREFOR

This application is a 35 USC § 371 National Stage entry of International Application No. PCT/KR2015/008487, filed on Aug. 13, 2015, and claims priority to U.S Provisional Application No. 62/037,098, filed Aug. 13, 2014, which is hereby incorporated by reference in its entirety for all purposes as if fully set forth herein.

TECHNICAL FIELD

The present invention relates to a wireless communication system, and more particularly, to a method for transmitting a synchronization signal for device-to-device (D2D) communication in a wireless communication system and device therefor.

BACKGROUND ART

A 3rd generation partnership project long term evolution (3GPP LTE) (hereinafter, referred to as 'LTE') communication system which is an example of a wireless communication system to which the present invention can be applied will be described in brief.

FIG. 1 is a diagram illustrating a network structure of an Evolved Universal Mobile Telecommunications System (E-UMTS) which is an example of a wireless communication system. The E-UMTS is an evolved version of the conventional UMTS, and its basic standardization is in progress under the 3rd Generation Partnership Project (3GPP). The E-UMTS may be referred to as a Long Term Evolution (LTE) system. Details of the technical specifications of the UMTS and E-UMTS may be understood with reference to Release 7 and Release 8 of "3rd Generation Partnership Project; Technical Specification Group Radio Access Network".

Referring to FIG. 1, the E-UMTS includes a User Equipment (UE), base stations (eNode B; eNB), and an Access Gateway (AG) which is located at an end of a network (E-UTRAN) and connected to an external network. The base stations may simultaneously transmit multiple data streams for a broadcast service, a multicast service and/or a unicast service.

One or more cells exist for one base station. One cell is set to one of bandwidths of 1.44, 3, 5, 10, 15 and 20 MHz to provide a downlink or uplink transport service to several user equipments. Different cells may be set to provide different bandwidths. Also, one base station controls data transmission and reception for a plurality of user equipments. The base station transmits downlink (DL) scheduling information of downlink data to the corresponding user equipment to notify the corresponding user equipment of time and frequency domains to which data will be transmitted and information related to encoding, data size, and hybrid automatic repeat and request (HARQ). Also, the base station transmits uplink (UL) scheduling information of uplink data to the corresponding user equipment to notify the corresponding user equipment of time and frequency domains that can be used by the corresponding user equipment, and information related to encoding, data size, and HARQ. An interface for transmitting user traffic or control traffic may be used between the base stations. A Core Network (CN) may include the AG and a network node or the like for user registration of the user equipment. The AG manages mobility of the user equipment on a Tracking Area (TA) basis, wherein one TA includes a plurality of cells.

Although the wireless communication technology developed based on WCDMA has been evolved into LTE, request and expectation of users and providers have continued to increase. Also, since another wireless access technology is being continuously developed, new evolution of the wireless communication technology will be required for competitiveness in the future. In this respect, reduction of cost per bit, increase of available service, use of adaptable frequency band, simple structure and open type interface, proper power consumption of the user equipment, etc. are required.

The UE reports state information of a current channel to the eNB periodically and/or aperiodically to assist the eNB to efficiently manage the wireless communication system. Since the reported channel state information may include results calculated in consideration of various situations and accordingly, a more efficient reporting method is needed.

DISCLOSURE OF THE INVENTION

Technical Task

Based on the above-described discussion, a method for transmitting a synchronization signal for device-to-device (D2D) communication in a wireless communication system and device therefor are proposed in the present invention.

It will be appreciated by persons skilled in the art that the objects that could be achieved with the present invention are not limited to what has been particularly described hereinabove and the above and other objects that the present invention could achieve will be more clearly understood from the following detailed description.

Technical Solutions

In an aspect of the present invention, provided is a method for transmitting a device-to-device (D2D) synchronization signal by a first user equipment (UE) in a wireless communication system, including: configuring at least one candidate value for a D2D synchronization signal period; and determining the D2D synchronization signal period for transmitting and receiving D2D signals to and from a second UE from among the at least one candidate value.

Additionally, the at least one candidate value may include 40 ms. Preferably, the at least one candidate value may include a period candidate value associated with at least one of a scheduling assignment channel, a D2D data channel, and a discovery channel Additionally, the method may further include performing D2D communication. In this case, when the D2D communication is performed, the D2D synchronization signal period may be determined as a minimum value among the at least one candidate value.

Additionally, the method may further include transmitting a D2D synchronization channel In this case, only when the D2D synchronization signal period is determined as the minimum value among the at least one candidate value, the D2D synchronization channel may be configured to be transmitted to the second UE.

Additionally, when the D2D synchronization signal period is determined as the minimum value among the at least one candidate value, the D2D synchronization signal period may be configured to include a plurality of D2D synchronization signal resources.

In another aspect of the present invention, provided is a first user equipment (UE) for transmitting a device-to-device (D2D) synchronization signal in a wireless communication system, including: a radio frequency (RF) unit; and a processor. In this case, the processor may be configured to configure at least one candidate value for a D2D synchronization signal period and determine the D2D synchronization signal period for transmitting and receiving D2D signals to and from a second UE from among the at least one candidate value.

Advantageous Effects

According to embodiments of the present invention, it is possible to efficiently transmit and receive a synchronization signal for D2D communication in a wireless communication system.

It will be appreciated by persons skilled in the art that the effects that can be achieved through the present invention are not limited to what has been particularly described hereinabove and other advantages of the present invention will be more clearly understood from the following detailed description.

DESCRIPTION OF DRAWINGS

The accompanying drawings, which are included to provide a further understanding of the invention and are incorporated in and constitute a part of this specification, illustrate embodiments of the invention and together with the description serve to explain the principles of the invention.

FIG. 2 illustrates structures of control and user planes of a radio interface protocol between a user equipment and E-UTRAN based on 3GPP radio access network standards.

BEST MODE FOR INVENTION

Figure 1:
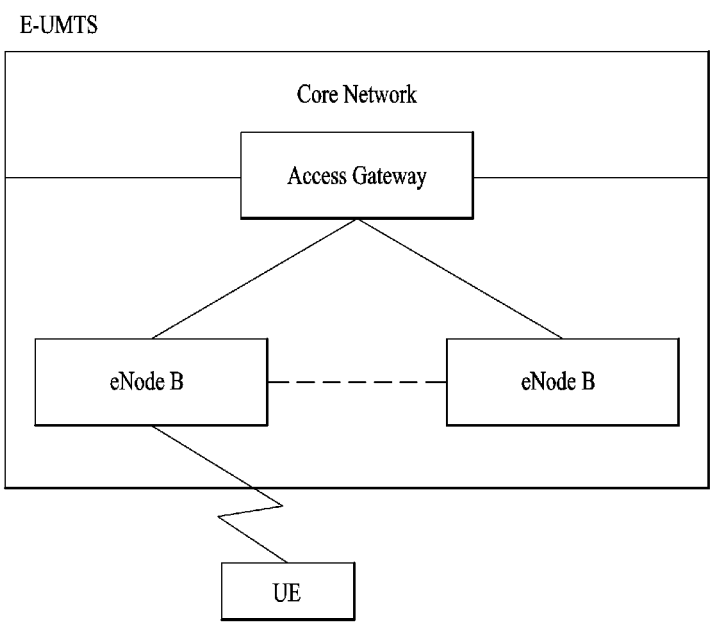
FIG. 1 is a schematic diagram of an E-UMTS network structure as one example of a wireless communication system.

The following technology may be used for various wireless access technologies such as CDMA (code division multiple access), FDMA (frequency division multiple access), TDMA (time division multiple access), OFDMA (orthogonal frequency division multiple access), and SC-FDMA (single carrier frequency division multiple access). The CDMA may be implemented by the radio technology such as UTRA (universal terrestrial radio access) or CDMA2000. The TDMA may be implemented by the radio technology such as global system for mobile communications (GSM)/general packet radio service (GPRS)/enhanced data rates for GSM evolution (EDGE). The OFDMA may be implemented by the radio technology such as IEEE 802.11 (Wi-Fi), IEEE 802.16 (WiMAX), IEEE 802.20, and evolved UTRA (E-UTRA). The UTRA is a part of a universal mobile telecommunications system (UMTS). A 3rd generation partnership project long term evolution (3GPP LTE) is a part of an evolved UMTS (E-UMTS) that uses E-UTRA, and adopts OFDMA in a downlink and SC-FDMA in an uplink. LTE-advanced (LTE-A) is an evolved version of the 3GPP LTE.

For clarification of the description, although the following embodiments will be described based on the 3GPP LTE/LTE-A, it is to be understood that the technical spirits of the present invention are not limited to the 3GPP LTE/LTE-A. Also, specific terminologies hereinafter used in the embodiments of the present invention are provided to assist understanding of the present invention, and various modifications may be made in the specific terminologies within the range that they do not depart from technical spirits of the present invention.

FIG. 2 is a diagram illustrating structures of a control plane and a user plane of a radio interface protocol between a user equipment and E-UTRAN based on the 3GPP radio access network standard. The control plane means a passageway where control messages are transmitted, wherein the control messages are used by the user equipment and the network to manage call. The user plane means a passageway where data generated in an application layer, for example, voice data or Internet packet data are transmitted.

A physical layer as the first layer provides an information transfer service to an upper layer using a physical channel The physical layer is connected to a medium access control (MAC) layer via a transport channel, wherein the medium access control layer is located above the physical layer. Data are transferred between the medium access control layer and the physical layer via the transport channel. Data are transferred between one physical layer of a transmitting side and the other physical layer of a receiving side via the physical channel The physical channel uses time and frequency as radio resources. In more detail, the physical channel is modulated in accordance with an orthogonal frequency division multiple access (OFDMA) scheme in a downlink, and is modulated in accordance with a single carrier frequency division multiple access (SC-FDMA) scheme in an uplink.

A medium access control (MAC) layer of the second layer provides a service to a radio link control (RLC) layer above the MAC layer via a logical channel The RLC layer of the second layer supports reliable data transmission. The RLC layer may be implemented as a functional block inside the MAC layer. In order to effectively transmit data using IP packets such as IPv4 or IPv6 within a radio interface having a narrow bandwidth, a packet data convergence protocol (PDCP) layer of the second layer performs header compression to reduce the size of unnecessary control information.

A radio resource control (RRC) layer located on the lowest part of the third layer is defined in the control plane only. The RRC layer is associated with configuration, re-configuration and release of radio bearers ('RBs') to be in charge of controlling the logical, transport and physical channels. In this case, the RB means a service provided by the second layer for the data transfer between the user equipment and the network. To this end, the RRC layers of the user equipment and the network exchange RRC message with each other. If the RRC layer of the user equipment is RRC connected with the RRC layer of the network, the user equipment is in an RRC connected mode. If not so, the user equipment is in an RRC idle mode. A non-access stratum (NAS) layer located above the RRC layer performs functions such as session management and mobility management.

One cell constituting a base station eNB is set to one of bandwidths of 1.4, 3.5, 5, 10, 15, and 20 MHz and provides a downlink or uplink transmission service to several user equipments. At this time, different cells may be set to provide different bandwidths.

As downlink transport channels carrying data from the network to the user equipment, there are provided a broadcast channel (BCH) carrying system information, a paging channel (PCH) carrying paging message, and a downlink shared channel (SCH) carrying user traffic or control messages. Traffic or control messages of a downlink multicast or broadcast service may be transmitted via the downlink SCH or an additional downlink multicast channel (MCH). Meanwhile, as uplink transport channels carrying data from the user equipment to the network, there are provided a random access channel (RACH) carrying an initial control message and an uplink shared channel (UL-SCH) carrying user traffic or control message. As logical channels located above the transport channels and mapped with the transport channels, there are provided a broadcast control channel (BCCH), a paging control channel (PCCH), a common control channel (CCCH), a multicast control channel (MCCH), and a multicast traffic channel (MTCH).

Figure 3:
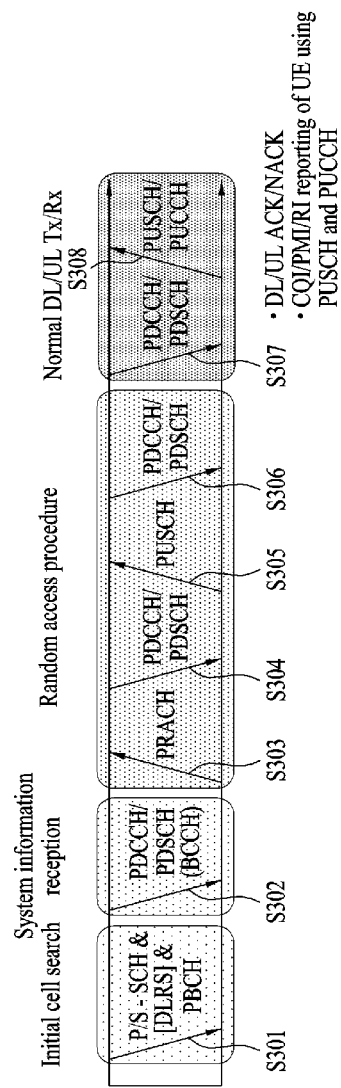
FIG. 3 illustrates physical channels used in the 3GPP LTE system and a general signal transmission method using the same.

FIG. 3 is a diagram illustrating physical channels used in a 3GPP LTE system and a general method for transmitting a signal using the physical channels.

The user equipment performs initial cell search such as synchronizing with the base station when it newly enters a cell or the power is turned on at step S301. To this end, the user equipment synchronizes with the base station by receiving a primary synchronization channel (P-SCH) and a secondary synchronization channel (S-SCH) from the base station, and acquires information such as cell ID, etc. Afterwards, the user equipment may acquire broadcast information within the cell by receiving a physical broadcast channel (PBCH) from the base station. Meanwhile, the user equipment may identify a downlink channel status by receiving a downlink reference signal (DL RS) at the initial cell search step.

The user equipment which has finished the initial cell search may acquire more detailed system information by receiving a physical downlink shared channel (PDSCH) in accordance with a physical downlink control channel (PDCCH) and information carried in the PDCCH at step S302.

Afterwards, the user equipment may perform a random access procedure (RACH) such as steps S303 to S306 to complete access to the base station. To this end, the user equipment may transmit a preamble through a physical random access channel (PRACH) (S303), and may receive a response message to the preamble through the PDCCH and the PDSCH corresponding to the PDCCH (S304). In case of a contention based RACH, the user equipment may perform a contention resolution procedure such as transmission (S305) of additional physical random access channel and reception (S306) of the physical downlink control channel and the physical downlink shared channel corresponding to the physical downlink control channel The user equipment which has performed the aforementioned steps may receive the physical downlink control channel (PDCCH)/physical downlink shared channel (PDSCH) (S307) and transmit a physical uplink shared channel (PUSCH) and a physical uplink control channel (PUCCH) (S308), as a general procedure of transmitting uplink/downlink signals. Control information transmitted from the user equipment to the base station will be referred to as uplink control information (UCI). The UCI includes HARQ ACK/NACK (Hybrid Automatic Repeat and reQuest Acknowledgement/Negative-ACK), SR (Scheduling Request), CSI (Channel State Information), etc. In this specification, the HARQ ACK/NACK will be referred to as HARQ-ACK or ACK/NACK (A/N). The HARQ-ACK includes at least one of positive ACK (simply, referred to as ACK), negative ACK (NACK), DTX and NACK/DTX. The CSI includes CQI (Channel Quality Indicator), PMI (Precoding Matrix Indicator), RI (Rank Indication), etc. Although the UCI is generally transmitted through the PUCCH, it may be transmitted through the PUSCH if control information and traffic data should be transmitted at the same time. Also, the user equipment may non-periodically transmit the UCI through the PUSCH in accordance with request/command of the network.

Figure 4:
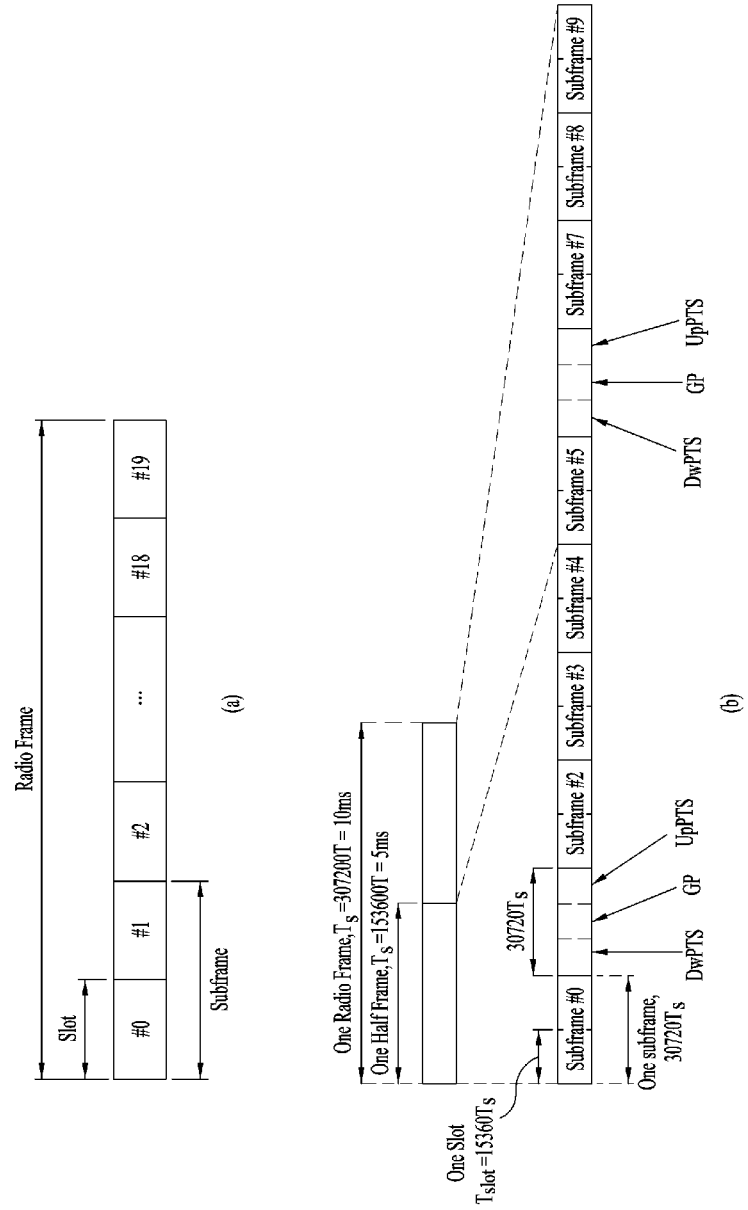
FIG. 4 illustrates a structure of a radio frame used in the LTE system.

FIG. 4 is a diagram illustrating a structure of a radio frame used in an LTE system.

Referring to FIG. 4, in a cellular OFDM radio packet communication system, uplink/downlink data packet transmission is performed in a unit of subframe, wherein one subframe is defined by a given time interval that includes a plurality of OFDM symbols. The 3GPP LTE standard supports a type 1 radio frame structure applicable to frequency division duplex (FDD) and a type 2 radio frame structure applicable to time division duplex (TDD).

FIG. 4(a) is a diagram illustrating a structure of a type 1 radio frame. The downlink radio frame includes 10 subframes, each of which includes two slots in a time domain. A time required to transmit one subframe will be referred to as a transmission time interval (TTI). For example, one subframe may have a length of 1 ms, and one slot may have a length of 0.5 ms. One slot includes a plurality of OFDM symbols in a time domain and a plurality of resource blocks (RB) in a frequency domain. Since the 3GPP LTE system uses OFDM in a downlink, OFDM symbols represent one symbol interval. The OFDM symbol may be referred to as SC-FDMA symbol or symbol interval. The resource block (RB) as a resource allocation unit may include a plurality of continuous subcarriers in one slot.

The number of OFDM symbols included in one slot may be varied depending on configuration of a cyclic prefix (CP). Examples of the CP include an extended CP and a normal CP. For example, if the OFDM symbols are configured by the normal CP, the number of OFDM symbols included in one slot may be 7. If the OFDM symbols are configured by the extended CP, since the length of one OFDM symbol is increased, the number of OFDM symbols included in one slot is smaller than that of OFDM symbols in case of the normal CP. For example, in case of the extended CP, the number of OFDM symbols included in one slot may be 6. If a channel state is unstable like the case where the user equipment moves at high speed, the extended CP may be used to reduce inter-symbol interference.

If the normal CP is used, since one slot includes seven OFDM symbols, one subframe includes 14 OFDM symbols. At this time, first maximum three OFDM symbols of each subframe may be allocated to a physical downlink control channel (PDCCH), and the other OFDM symbols may be allocated to a physical downlink shared channel (PDSCH).

FIG. 4(b) is a diagram illustrating a structure of a type 2 radio frame. The type 2 radio frame includes two half frames, each of which includes four general subframes, which include two slots, and a special subframe which includes a downlink pilot time slot (DwPTS), a guard period (GP), and an uplink pilot time slot (UpPTS).

In the special subframe, the DwPTS is used for initial cell search, synchronization or channel estimation at the user equipment. The UpPTS is used for channel estimation at the base station and uplink transmission synchronization of the user equipment. In other words, the DwPTS is used for downlink transmission, whereas the UpPTS is used for uplink transmission. Especially, the UpPTS is used for PRACH preamble or SRS transmission. Also, the guard period is to remove interference occurring in the uplink due to multipath delay of downlink signals between the uplink and the downlink.

Configuration of the special subframe is defined in the current 3GPP standard document as illustrated in Table 1 below. Table 1 illustrates the DwPTS and the UpPTS in case of $T_s=1/(15000\times2048)$, and the other region is configured for the guard period.

TABLE 1

| Special subframe configuration | Normal cyclic prefix in downlink | | | Extended cyclic prefix in downlink | | |
|---|---|---|---|---|---|---|
| | | UpPTS | | | UpPTS | |
| | DwPTS | Normal cyclic prefix in uplink | Extended cyclic prefix in uplink | DwPTS | Normal cyclic prefix in uplink | Extended cyclic prefix in uplink |
| 0 | $6592 \cdot T_s$ | $2192 \cdot T_s$ | $2560 \cdot T_s$ | $7680 \cdot T_s$ | $2192 \cdot T_s$ | $2560 \cdot T_s$ |
| 1 | $19760 \cdot T_s$ | | | $20480 \cdot T_s$ | | |
| 2 | $21952 \cdot T_s$ | | | $23040 \cdot T_s$ | | |
| 3 | $24144 \cdot T_s$ | | | $25600 \cdot T_s$ | | |
| 4 | $26336 \cdot T_s$ | | | $7680 \cdot T_s$ | $4384 \cdot T_s$ | $5120 \cdot T_s$ |
| 5 | $6592 \cdot T_s$ | $4384 \cdot T_s$ | $5120 \cdot T_s$ | $20480 \cdot T_s$ | | |
| 6 | $19760 \cdot T_s$ | | | $23040 \cdot T_s$ | | |
| 7 | $21952 \cdot T_s$ | | | $12800 \cdot T_s$ | | |
| 8 | $24144 \cdot T_s$ | | | — | — | — |
| 9 | $13168 \cdot T_s$ | | | — | — | — |

In the meantime, the structure of the type 2 radio frame, that is, uplink/downlink configuration (UL/DL configuration) in the TDD system is as illustrated in Table 2 below.

TABLE 2

| Uplink-downlink configuration | Downlink-to-Uplink Switch-point periodicity | Subframe number | | | | | | | | | |
|---|---|---|---|---|---|---|---|---|---|---|---|
| | | 0 | 1 | 2 | 3 | 4 | 5 | 6 | 7 | 8 | 9 |
| 0 | 5 ms | D | S | U | U | U | D | S | U | U | U |
| 1 | 5 ms | D | S | U | U | D | D | S | U | U | D |
| 2 | 5 ms | D | S | U | D | D | D | S | U | D | D |
| 3 | 10 ms | D | S | U | U | U | D | D | D | D | D |
| 4 | 10 ms | D | S | U | U | D | D | D | D | D | D |
| 5 | 10 ms | D | S | U | D | D | D | D | D | D | D |
| 6 | 5 ms | D | S | U | U | U | D | S | U | U | D |

In the above Table 2, D means the downlink subframe, U means the uplink subframe, and S means the special subframe. Also, Table 2 also illustrates a downlink-uplink switching period in the uplink/downlink subframe configuration of each system.

The structure of the aforementioned radio frame is only exemplary, and various modifications may be made in the number of subframes included in the radio frame, the number of slots included in the subframe, or the number of symbols included in the slot.

Figure 5:
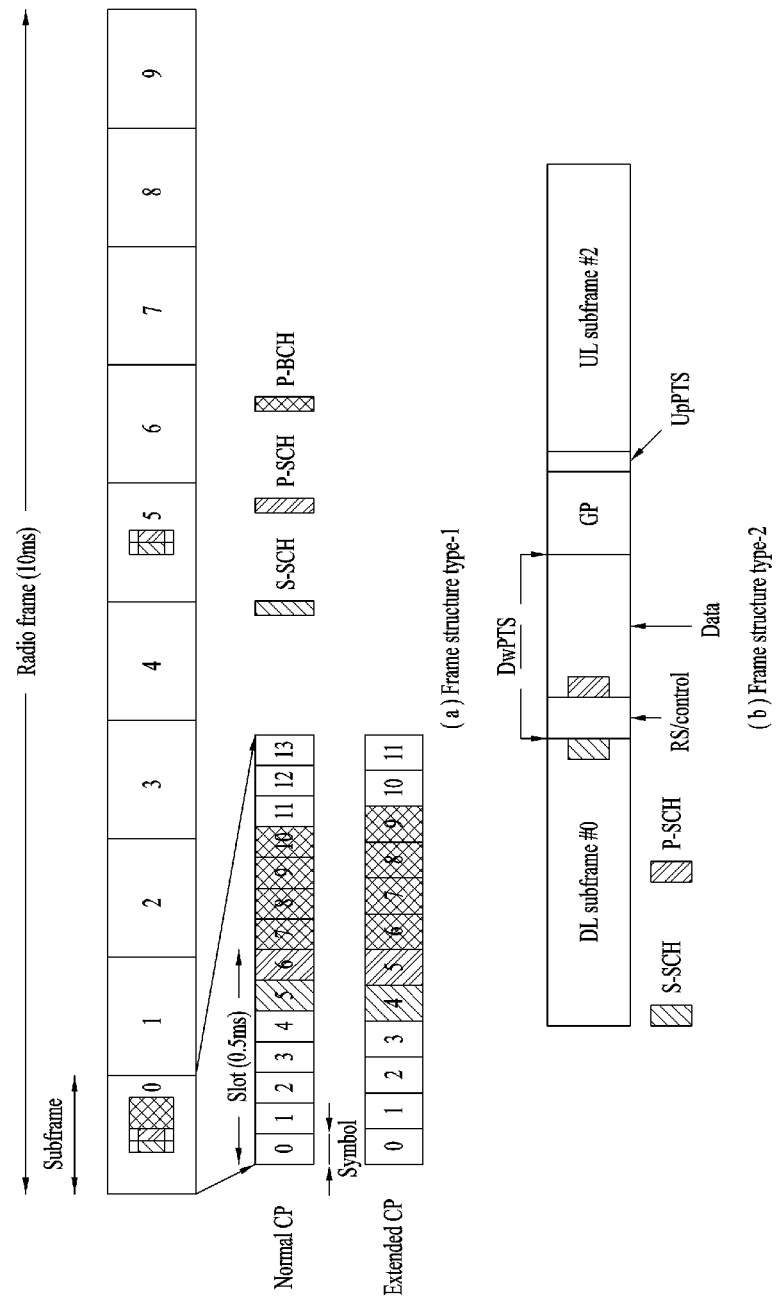
FIG. 5 illustrates a primary broadcast channel (P-BCH) and a synchronization channel (SCH) of the LTE system.

FIG. 5 illustrates a primary broadcast channel (P-BCH) and a synchronization channel (SCH). The SCH includes a primary synchronization channel (P-SCH) and a secondary synchronization channel (S-SCH). A primary synchronization signal (PSS) is transmitted on the P-SCH and a secondary synchronization signal (SSS) is transmitted on the S-SCH.

Referring to FIG. 5, in the frame structure type-1 (i.e., FDD), the P-SCH is located at a last OFDM symbol in each of slot #0 (i.e., a first slot of subframe #0) and slot #10 (i.e., a first slot of subframe #5) in every radio frame. The S-SCH is located at a second last OFDM symbol in each of slot #0 and slot #10 in every radio frame. The S-SCH and the P-SCH are located at neighboring OFDM symbols. In the frame structure type-2 (i.e., TDD), the P-SCH is transmitted through a third OFDM symbol in each of subframes #1 and #6. The S-SCH is located at a last OFDM symbol in each of slot #1 (i.e., a second slot of subframe #0) and slot #11 (i.e., a second slot of subframe #5). The P-BCH is transmitted in every four radio frames irrespective of the frame structure type. In addition, the P-BCH is transmitted using the first to fourth OFDM symbols in the second slot of the subframe #0.

The P-SCH is transmitted using 72 subcarriers (10 subcarriers are reserved and 62 subcarriers are used for PSS transmission) based on a DC (direct current) subcarrier in a corresponding OFDM symbol. The S-SCH is transmitted using 72 subcarriers (10 subcarriers are reserved and 62 subcarriers are used for SSS transmission) based on a DC subcarrier in a corresponding OFDM symbol. The P-BCH is mapped to 72 subcarriers based on a DC subcarrier and four OFDM symbols in one subframe.

Figure 6:
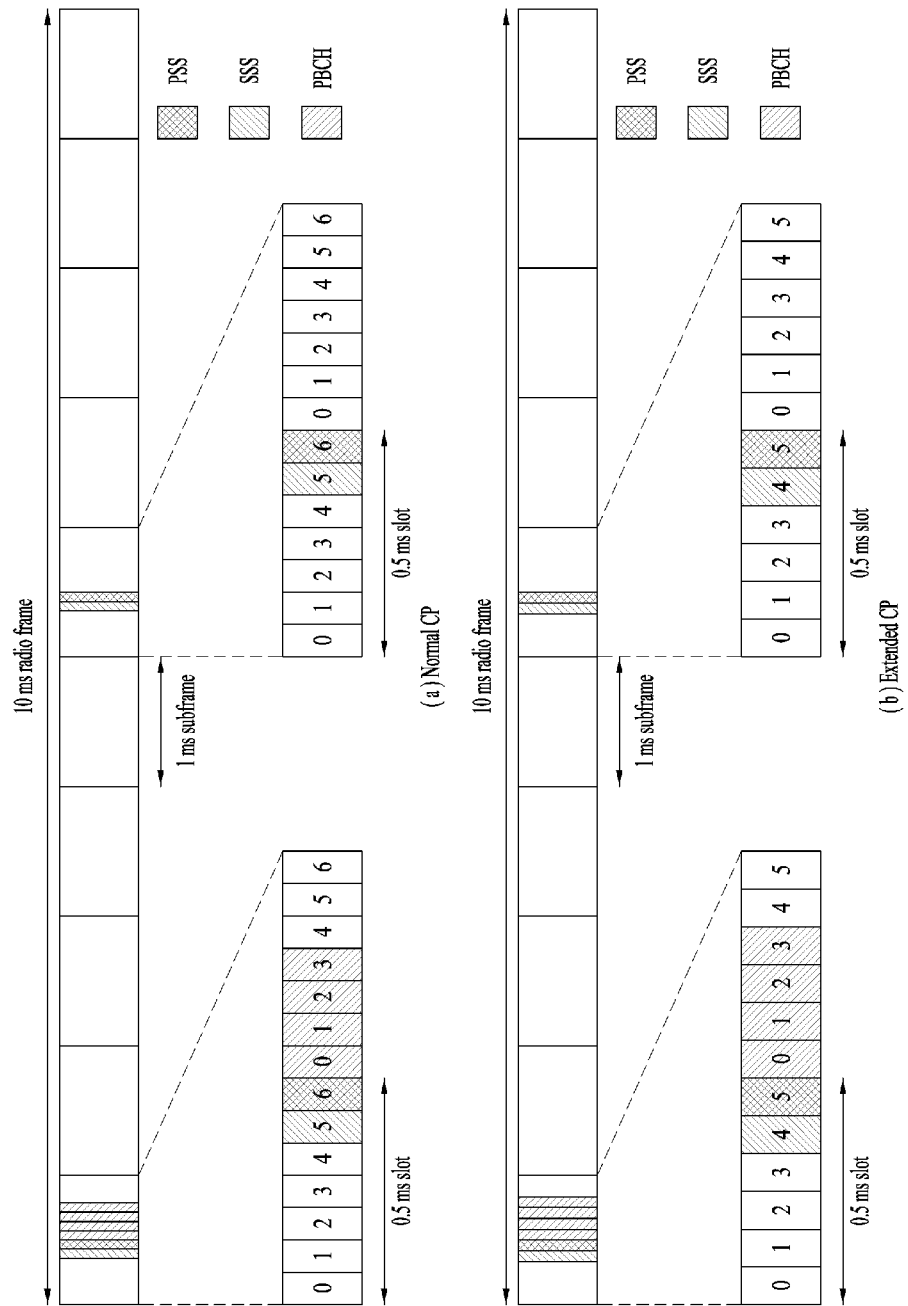
FIG. 6 illustrates a radio frame structure for transmission of a synchronization signal (SS).

FIG. 6 illustrates a radio frame structure for transmission of a synchronization signal (SS). In particular, FIG. 6 illustrates a radio frame structure for transmission of an SS and a PBCH in frequency division duplex (FDD). More specifically, FIG. 6(a) illustrates locations for transmitting an SS and a PBCH in a radio frame configured with a normal cyclic prefix (CP) and FIG. 6(b) illustrates locations for transmitting an SS and a PBCH in a radio frame configured with an extended CP.

If a UE is powered on or newly enters a cell, the UE performs an initial cell search procedure for obtaining time and frequency synchronization with the cell and detecting a physical cell identity of the cell. To this end, the UE may match synchronization with an eNB by receiving synchronization signals, e.g. a primary synchronization signal (PSS) and a secondary synchronization signal (SSS), from the eNB and then obtain information such as a cell identity (ID) and the like.

The SS will be described in detail with reference to FIG. 6. The SS is categorized into the PSS and the SSS. The PSS is used to acquire time-domain synchronization and/or frequency-domain synchronization such as OFDM symbol synchronization, slot synchronization, etc. The SSS is used to acquire frame synchronization, a cell group ID, and/or a cell's CP configuration (i.e. information indicating whether to a normal CP or an extended is used). Referring to FIG. 6, the PSS and the SSS are transmitted through two OFDM symbols in each radio frame. Specifically, the SS is transmitted in a first slot in each of subframe 0 and subframe 5 in consideration of a GSM (global system for mobile communication) frame length of 4.6 ms for facilitation of an inter-radio access technology (inter-RAT) measurement. In particular, the PSS is transmitted in a last OFDM symbol in each of the first slot of subframe 0 and the first slot of subframe 5. In addition, the SSS is transmitted in the second last OFDM symbol in each of the first slot of subframe 0 and the first slot of subframe 5. Boundaries of the corresponding radio frame may be detected through the SSS. The PSS is transmitted in the last OFDM symbol of the corresponding slot and the SSS is transmitted in the OFDM symbol immediately before the OFDM symbol in which the PSS is transmitted. According to a transmission diversity scheme for the SS, only a single antenna port is used. However, the transmission diversity scheme for the SS standards is not separately defined in the current standards. In other words, a single antenna port transmission scheme or a transmission scheme transparent to a UE (e.g. precoding vector switching (PVS), time switched transmit diversity (TSTD), or cyclic delay diversity (CDD)) can be adopted for transmission diversity of the SS.

The SS can represent total 504 unique physical layer cell IDs through combinations of 3 PSSs and 168 SSSs. In other words, the physical layer cell IDs are grouped into 168 physical layer cell ID groups each including three unique IDs so that each physical layer cell ID is a part of only one physical layer cell ID group. Thus, a physical layer cell ID $N^{cell}_{ID}$ is uniquely defined with a number $N^{(1)}_{ID}$ in the range of 0 to 167 indicating a physical layer cell ID group and a number $N^{(2)}_{ID}$ in the range of 0 to 2 indicating a physical layer ID in the physical layer cell ID group (i.e., $N^{cell}_{ID} =$ $3N^{(1)}_{ID} + N^{(2)}_{ID}$). A UE can obtain one of the three unique physical layer IDs by detecting the PSS and then identify one of the 168 physical layer cell IDs, which are associated with the physical layer ID, by detecting the SSS. A Zadoff-Chu (ZC) sequence of length 63 is defined in a frequency domain and the sequence is used as the PSS. For example, the ZC sequence can be defined according to Equation 1 below.

Equation 1

$$d_u(n) = e^{-j\frac{\pi u n(n+1)}{N_{ZC}}} \qquad \text{[Equation 1]}$$

In Equation 1, $N_{ZC}$ is set to 63 ($N_{ZC}=63$) and a sequence element corresponding to a DC subcarrier, n=31, is punctured.

The PSS is mapped to 6 RBs (=72 subcarriers) adjacent to a center frequency. Among the 72 subcarriers, 9 remaining subcarriers carry a value of 0 at all times and serve as elements facilitating filter design for performing synchronization. In order to define total three PSSs, u=24, u=29, and u=34 are used in Equation 1. Since u=24 and u=34 have a conjugate symmetry relation, two correlations may be simultaneously performed. In this case, the conjugate symmetry means the relationship in Equation 2 below.

Equation 2

$$d_u(n) = (-1)^n (d_{N_{ZC}-u}(n))^*, \text{ when } N_{ZC} \text{ is even number}$$

$$d_u(n) = (d_{N_{ZC}-u}(n))^*, \text{ when } N_{ZC} \text{ is odd number} \qquad \text{[Equation 2]}$$

A one-shot correlator for u=29 and u=34 can be implemented using conjugate symmetry characteristics. Moreover, compared to a case without the conjugate symmetry, the total amount of calculation can be reduced by about 33.3%.

More specifically, a sequence d(n) used for the PSS can be generated from a frequency-domain ZC sequence according to Equation 3 below Equation 3

$$d_u(n) = \begin{cases} e^{-j\frac{\pi u n(n+1)}{63}} & n = 0, 1, \ldots, 30 \\ e^{-j\frac{\pi u (n+1)(n+2)}{63}} & n = 31, 32, \ldots, 61 \end{cases} \qquad \text{[Equation 3]}$$

In Equation 3, a ZC root sequence index u can be given as shown in Table 3 below.

TABLE 3

| $N^{(2)}_{ID}$ | Root index u |
| --- | --- |
| 0 | 25 |
| 1 | 29 |
| 2 | 34 |

Referring to FIG. 6, since the PSS is transmitted every 5 ms, a UE may know that a corresponding subframe is one of subframe 0 and subframe 5 by detecting the PSS. However, the UE cannot know whether the subframe is subframe 0 or subframe 5. In other words, the UE cannot recognize boundaries of a radio frame only through the PSS. That is, frame synchronization cannot be obtained only from the PSS. The UE detects the boundaries of the radio frame by detecting an SSS which is transmitted twice in one radio frame with different sequences.

Figure 7:
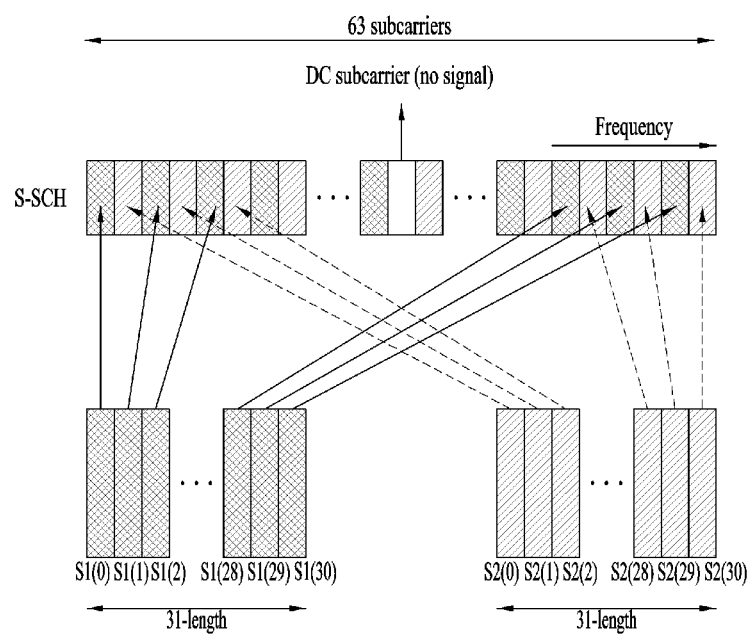
FIG. 7 is a reference diagram for explaining a scheme of generating a secondary synchronization signal (SSS).

FIG. 7 is a diagram for explaining a scheme of generating a secondary synchronization signal (SSS). Specifically, FIG. 7 illustrates a mapping relationship of two sequences between a logical domain and a physical domain.

A sequence used for the SSS corresponds to an interleaved concatenation of two m-sequences each of length 31. The concatenated sequence is scrambled by a scrambling sequence given by the PSS. In this case, the m-sequence is a kind of a pseudo noise (PN) sequence.

Referring to FIG. 7, if two m-sequences used for generating an SSS code are denoted by S1 and S2 respectively, then two different PSS-based sequences S1 and S2 are scrambled into the SSS. In this case, S1 and S2 are scrambled by different sequences. A PSS-based scrambling code may be obtained by cyclically shifting an m-sequence generated from a polynomial of $x^5+x^3+1$. Depending on a PSS index, 6 sequences are generated by the cyclic shift of the m-sequence. Subsequently, S2 is scrambled by an S1-based scrambling code. The S1-based scrambling code may be obtained by cyclically shifting an m-sequence generated from a polynomial of $x^5+x^4+x^2+x^1+1$. Depending on on S1 index, 8 sequences are generated by the cyclic shift of the m-sequence. The SSS code is swapped every 5 ms, whereas the PSS-based scrambling code is not swapped. For example, assuming that an SSS of subframe 0 carries a cell group ID through a combination of (S1, S2), an SSS of subframe 5 carries a sequence swapped as (S2, S1). Thus, boundaries of a radio frame of 10 ms can be discerned. The SSS code used in this case is generated based on a polynomial of $x^5+x^2+1$. In addition, total 31 codes can be generated through different cyclic shifts of the m-sequence of length 31.

A combination of two m-sequences, each of which has length 31, used for defining the SSS differs in subframe 0 and subframe 5. Total 168 cell group IDs are represented according to a combination of the two m-sequences each of length 31. The m-sequences used as sequences for the SSS have a robust property in a frequency selective environment. In addition, since the m-sequences can be transformed by high-speed m-sequence transform that uses fast Hadamard transform, if the m-sequences are utilized for the SSS, the amount of calculation necessary for a UE to interpret the SSS can be reduced. Moreover, since the SSS is composed of two short codes, the amount of calculation of the UE can also be reduced.

Details of generation of the SSS is described hereinafter. Sequences of d(0), . . . , d(61) used for the SSS are an interleaved concatenation of two binary sequences, each of which has length 31. The concatenated sequence is scrambled by a sequence given by the PSS.

A combination of two sequences, each of which has length 31, used for defining the PSS can be different in subframe 0 and subframe 5 according to Equation 4.

Equation 4

$$d(2n) = \begin{cases} s_0^{(m_0)}(n)c_0(n) & \text{in subframe 0} \\ s_1^{(m_1)}(n)c_0(n) & \text{in subframe 5} \end{cases}$$

$$d(2n+1) = \begin{cases} s_1^{(m_1)}(n)c_1(n)z_1^{(m_0)}(n) & \text{in subframe 0} \\ s_0^{(m_0)}(n)c_1(n)z_1^{(m_1)}(n) & \text{in subframe 5} \end{cases}$$

[Equation 4]

In Equation 4, $0 \le n \le 30$. Indices $m_0$ and $m_1$ are derived from the physical layer cell identity group $N^{(1)}{}_{ID}$ according to Equation 5.

Equation 5

$$m_0 = m' \bmod 31$$
$$m_1 = (m_0 + \lfloor m'/31 \rfloor + 1) \bmod 31$$
$$m' = N^{(1)}_{ID} + q(q+1)/2,$$
$$q = \left\lfloor \frac{N^{(1)}_{ID} + q'(q'+1)/2}{30} \right\rfloor,$$
$$q' = \lfloor N^{(1)}_{ID}/30 \rfloor$$

[Equation 5]

The output in Equation 5 will be listed in Table 4 after Equation 11.

Two sequences $S^{(m0)0}(n)$ and $S^{(m1)1}(n)$ are defined as two different cyclic shifts of an m-sequence s(n) according to Equation 6.

Equation 6

$$s_0^{(m0)}(n) = s((n+m_0) \bmod 31)$$

$$s_1^{(m1)}(n) = s((n+m_1) \bmod 31)$$

[Equation 6]

In Equation 6, $s(i) = 1 - 2x(i)$ (where $0 \le i \le 30$) is defined according to Equation 7 with initial conditions $x(0)=0$, $x(1)=0$, $x(2)$, $x(3)=0$, and $x(4)=1$.

Equation 7

$$x(\bar{i}+5) = (x(\bar{i}+3)+x(\bar{i})) \bmod 2, \; 0 \le \bar{i} \le 25$$

[Equation 7]

Two scrambling sequences $c_0(n)$ and $c_1(n)$ depend on the PSS and are defined by two different cyclic shifts of an m-sequence c(n) according to Equation 8.

Equation 8

$$c_0(n) = c((n+N_{ID}^{(2)}) \bmod 31)$$

$$c_1(n) = c((n+N_{ID}^{(2)}+3) \bmod 31)$$

[Equation 8]

In Equation 8, $N^{(2)}{}_{ID} \in \{0, 1, 2\}$ is a physical layer identity in the physical layer cell identity group $N^{(1)}{}_{ID}$ and $c(i) = 1 - 2x(i)$ (where $0 \le i \le 30$) is defined according to Formula 9 with initial conditions $x(0)=0$, $x(1)=0$, $x(2)$, $x(3)=0$, and $x(4)=1$.

Equation 9

$$x(\bar{i}+5) = (x(\bar{i}+3)+x(\bar{i})) \bmod 2, \; 0 \le \bar{i} \le 25$$

[Equation 9]

Scrambling sequences $Z^{(m0)1}(n)$ and $Z^{(m1)1}(n)$ are defined by cyclic shifts of an m-sequence z(n) according to Equation 10.

Equation 10

$$z_1^{(m0)}(n) = z((n+(m_0 \bmod 8)) \bmod 31)$$

$$z_1^{(m1)}(n) = z((n+(m_1 \bmod 8)) \bmod 31)$$

[Equation 10]

In Equation 10, $m_0$ and $m_1$ are obtained from Table 4 after Equation 11 and $z(i) = 1 - 2x(i)$ (where $0 \le i \le 30$) is defined according to Equation 11 with initial conditions $x(0)=0$, $x(1)=0$, $x(2)$, $x(3)=0$, and $x(4)=1$.

Equation 11

$$x(\bar{i}+5) = (x(\bar{i}+4)+x(\bar{i}+2)+x(\bar{i}+1)+x(\bar{i})) \bmod 2, \; 0 \le \bar{i} \le 25$$

[Equation 11]

TABLE 4

| N(1) ID | m0 | m1 |
|---|---|---|
| 0 | 0 | 1 |
| 1 | 1 | 2 |

TABLE 4-continued

| N(1) ID | m0 | m1 |
|---|---|---|
| 2 | 2 | 3 |
| 3 | 3 | 4 |
| 4 | 4 | 5 |
| 5 | 5 | 6 |
| 6 | 6 | 7 |
| 7 | 7 | 8 |
| 8 | 8 | 9 |
| 9 | 9 | 10 |
| 10 | 10 | 11 |
| 11 | 11 | 12 |
| 12 | 12 | 13 |
| 13 | 13 | 14 |
| 14 | 14 | 15 |
| 15 | 15 | 16 |
| 16 | 16 | 17 |
| 17 | 17 | 18 |
| 18 | 18 | 19 |
| 19 | 19 | 20 |
| 20 | 20 | 21 |
| 21 | 21 | 22 |
| 22 | 22 | 23 |
| 23 | 23 | 24 |
| 24 | 24 | 25 |
| 25 | 25 | 26 |
| 26 | 26 | 27 |
| 27 | 27 | 28 |
| 28 | 28 | 29 |
| 29 | 29 | 30 |
| 30 | 0 | 2 |
| 31 | 1 | 3 |
| 32 | 2 | 4 |
| 33 | 3 | 5 |
| 34 | 4 | 6 |
| 35 | 5 | 7 |
| 36 | 6 | 8 |
| 37 | 7 | 9 |
| 38 | 8 | 10 |
| 39 | 9 | 11 |
| 40 | 10 | 12 |
| 41 | 11 | 13 |
| 42 | 12 | 14 |
| 43 | 13 | 15 |
| 44 | 14 | 16 |
| 45 | 15 | 17 |
| 46 | 16 | 18 |
| 47 | 17 | 19 |
| 48 | 18 | 20 |
| 49 | 19 | 21 |
| 50 | 20 | 22 |
| 51 | 21 | 23 |
| 52 | 22 | 24 |
| 53 | 23 | 25 |
| 54 | 24 | 26 |
| 55 | 25 | 27 |
| 56 | 26 | 28 |
| 57 | 27 | 29 |
| 58 | 28 | 30 |
| 59 | 0 | 3 |
| 60 | 1 | 4 |
| 61 | 2 | 5 |
| 62 | 3 | 6 |
| 63 | 4 | 7 |
| 64 | 5 | 8 |
| 65 | 6 | 9 |
| 66 | 7 | 10 |
| 67 | 8 | 11 |
| 68 | 9 | 12 |
| 69 | 10 | 13 |
| 70 | 11 | 14 |
| 71 | 12 | 15 |
| 72 | 13 | 16 |
| 73 | 14 | 17 |
| 74 | 15 | 18 |
| 75 | 16 | 19 |
| 76 | 17 | 20 |
| 77 | 18 | 21 |
| 78 | 19 | 22 |
| 79 | 20 | 23 |
| 80 | 21 | 24 |
| 81 | 22 | 25 |
| 82 | 23 | 26 |
| 83 | 24 | 27 |
| 84 | 25 | 28 |
| 85 | 26 | 29 |
| 86 | 27 | 30 |
| 87 | 0 | 4 |
| 88 | 1 | 5 |
| 89 | 2 | 6 |
| 90 | 3 | 7 |
| 91 | 4 | 8 |
| 92 | 5 | 9 |
| 93 | 6 | 10 |
| 94 | 7 | 11 |
| 95 | 8 | 12 |
| 96 | 9 | 13 |
| 97 | 10 | 14 |
| 98 | 11 | 15 |
| 99 | 12 | 16 |
| 100 | 13 | 17 |
| 101 | 14 | 18 |
| 102 | 15 | 19 |
| 103 | 16 | 20 |
| 104 | 17 | 21 |
| 105 | 18 | 22 |
| 106 | 19 | 23 |
| 107 | 20 | 24 |
| 108 | 21 | 25 |
| 109 | 22 | 26 |
| 110 | 23 | 27 |
| 111 | 24 | 28 |
| 112 | 25 | 29 |
| 113 | 26 | 30 |
| 114 | 0 | 5 |
| 115 | 1 | 6 |
| 116 | 2 | 7 |
| 117 | 3 | 8 |
| 118 | 4 | 9 |
| 119 | 5 | 10 |
| 120 | 6 | 11 |
| 121 | 7 | 12 |
| 122 | 8 | 13 |
| 123 | 9 | 14 |
| 124 | 10 | 15 |
| 125 | 11 | 16 |
| 126 | 12 | 17 |
| 127 | 13 | 18 |
| 128 | 14 | 19 |
| 129 | 15 | 20 |
| 130 | 16 | 21 |
| 131 | 17 | 22 |
| 132 | 18 | 23 |
| 133 | 19 | 24 |
| 134 | 20 | 25 |
| 135 | 21 | 26 |
| 136 | 22 | 27 |
| 137 | 23 | 28 |
| 138 | 24 | 29 |
| 139 | 25 | 30 |
| 140 | 0 | 6 |
| 141 | 1 | 7 |
| 142 | 2 | 8 |
| 143 | 3 | 9 |
| 144 | 4 | 10 |
| 145 | 5 | 11 |
| 146 | 6 | 12 |
| 147 | 7 | 13 |
| 148 | 8 | 14 |
| 149 | 9 | 15 |
| 150 | 10 | 16 |
| 151 | 11 | 17 |
| 152 | 12 | 18 |
| 153 | 13 | 19 |
| 154 | 14 | 20 |
| 155 | 15 | 21 |

TABLE 4-continued

| N(1) ID | m0 | m1 |
|---|---|---|
| 156 | 16 | 22 |
| 157 | 17 | 23 |
| 158 | 18 | 24 |
| 159 | 19 | 25 |
| 160 | 20 | 26 |
| 161 | 21 | 27 |
| 162 | 22 | 28 |
| 163 | 23 | 29 |
| 164 | 24 | 30 |
| 165 | 0 | 7 |
| 166 | 1 | 8 |
| 167 | 2 | 9 |
| — | — | — |
| — | — | — |

Having demodulated a DL signal by performing a cell search procedure using the SSS and determined time and frequency parameters necessary to perform UL signal transmission at an accurate time, a UE can communicate with an eNB only after obtaining system information necessary for a system configuration of the UE from the eNB.

The system information is configured with a master information block (MIB) and system information blocks (SIBs). Each SIB includes a set of functionally related parameters and is categorized into an MIB, SIB Type 1 (SIB1), SIB Type 2 (SIB2), and SIB3 to SIB8 according to the included parameters. The MIB includes most frequently transmitted parameters which are essential for a UE to initially access a network served by an eNB. The SIB1 includes not only information on time-domain scheduling for other SIBs but also parameters necessary to determine whether a specific cell is suitable in cell selection.

The UE may receive the MIB through a broadcast channel (e.g. a PBCH). The MIB includes a downlink system bandwidth (DL BW), a PHICH configuration, and a system frame number (SFN). Thus, the UE can explicitly know information on the DL BW, SFN, and PHICH configuration by receiving the PBCH. On the other hand, the UE may implicitly know information on the number of transmission antenna ports of the eNB. The information on the number of the transmission antennas of the eNB is implicitly signaled by masking (e.g. XOR operation) a sequence corresponding to the number of the transmission antennas to 16-bit CRC (cyclic redundancy check) used in detecting an error of the PBCH.

The PBCH is mapped to four subframes during 40 ms. The time of 40 ms is for blind detection and there is no explicit signaling for the time of 40 ms. In the time domain, the PBCH is transmitted in OFDM symbols 0 to 3 of slot 1 in subframe 0 (i.e., the second slot of subframe 0) of a radio frame.

In the frequency domain, PSS/SSS and PBCH are transmitted irrespective of an actual system bandwidth in total 6 RBs, i.e., 3 RBs in the left side and 3 RBs in the right side with reference to a DC subcarrier within a corresponding OFDM symbol. In other words, the PSS/SSS and the PBCH are transmitted only in 72 subcarriers. Therefore, a UE is configured to detect or decode the SS and the PBCH irrespective of a downlink transmission bandwidth configured for the UE.

Having accessed the network served by the eNB after completing the initial cell search, the UE is able to obtain more detailed system information by receiving PDCCH and PDSCH according to information carried on the PDCCH. After performing the above-described procedure, the UE may perform PDCCH/PDSCH reception and PUSCH/PUCCH transmission as a general UL/DL signal transmission procedure.

Figure 8:
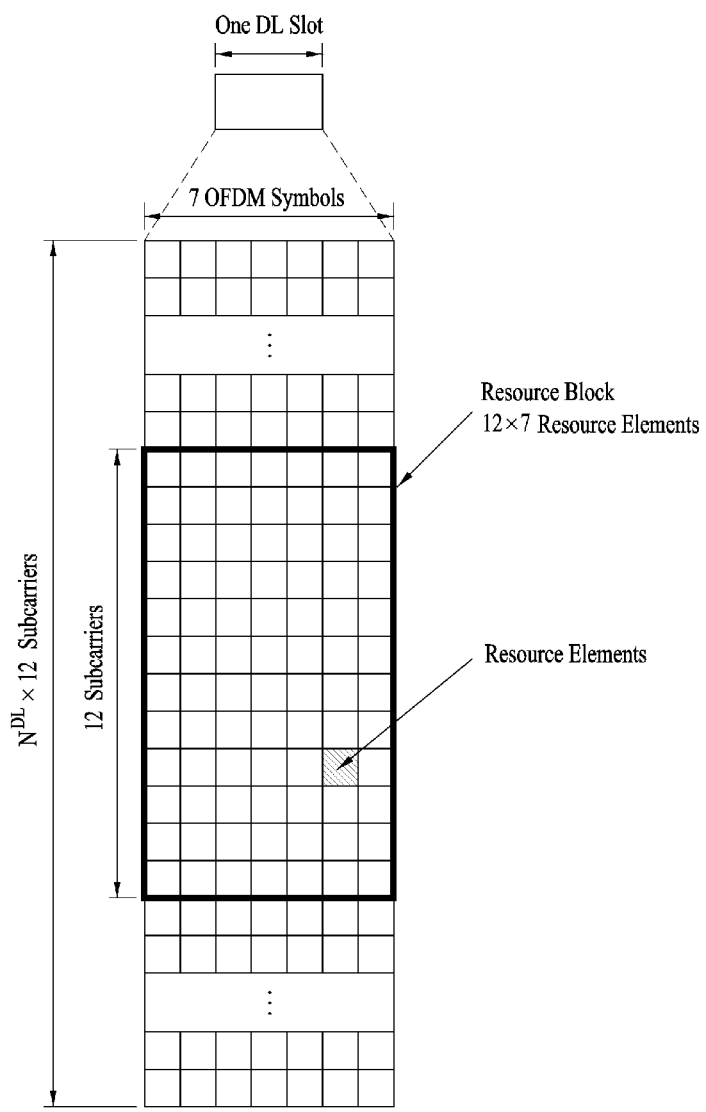
FIG. 8 illustrates a resource grid for a downlink slot.

FIG. 8 illustrates a resource grid for a downlink slot.

Referring to FIG. 8, a DL slot includes $N_{symb}^{DL}$ OFDM symbols in a time domain and $N_{RB}^{DL}$ resource blocks in a frequency domain. Since each of the resource blocks includes $N_{SC}^{RB}$ subcarriers, the DL slot includes $N_{RB}^{DL} \times N_{SC}^{RB}$ subcarriers in the frequency domain. Although FIG. 8 shows an example in which the DL slot includes 7 OFDM symbols and the resource block includes 12 subcarriers, the present invention is not limited thereto. For instance, the number of OFDM symbols included in the DL slot can vary depending to a length of a cyclic prefix (CP).

Each element on a resource grid is referred to as a resource element (RE) and a single resource element is indicated by one OFDM symbol index and one subcarrier index. A single RB is configured with $N_{symb}^{DL} \times N_{SC}^{RB}$ resource elements. The number ($N_{RB}^{DL}$) of resource blocks included in the DL slot depends on a DL transmission bandwidth configured in a cell.

Figure 9:
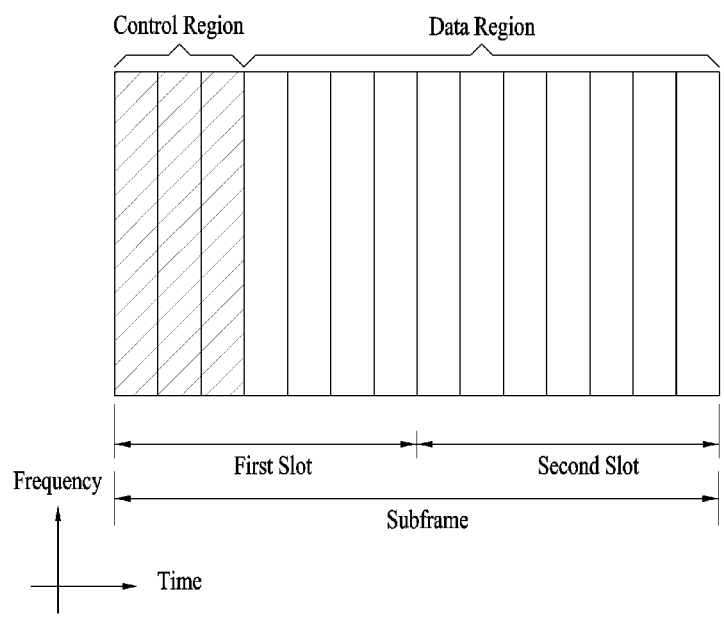
FIG. 9 illustrates a structure of a downlink radio frame used in the LTE system.

FIG. 9 illustrates a structure of a downlink radio frame.

Referring to FIG. 9, up to 3 (or 4) OFDM symbols located at a head part of a first slot of a subframe correspond to a control region to which a control channel is assigned. And, the rest of OFDM symbols correspond to a data region to which PDSCH (physical downlink shared channel) is assigned. For example, DL control channels used in the LTE system may include a PCFICH (physical control format indicator channel), a PDCCH (physical downlink control channel), a PHICH (physical hybrid ARQ indicator channel) and the like. The PCFICH is transmitted on a first OFDM symbol of a subframe and carries information on the number of OFDM symbols in the subframe used for control channel transmission. The PHICH carries an HARQ ACK/NACK (hybrid automatic repeat request acknowledgment/negative-acknowledgment) signal in response to UL transmission.

Control information transmitted on the PDCCH is called DCI (downlink control information). The DCI includes resource allocation information and other control information for a user equipment or a user equipment group. For instance, the DCI may include UL/DL scheduling information, UL transmission (Tx) power control command and the like.

The PDCCH carries transmission format and resource allocation information of a DL-SCH (downlink shared channel), transmission format and resource allocation information of a UL-SCH (uplink shared channel), paging information on a PCH (paging channel), system information on a DL-SCH, resource allocation information of a higher-layer control message such as a random access response transmitted on a PDSCH, a Tx power control command set for individual user equipments in a user equipment group, a Tx power control command, activation indication information of a VoIP (voice over IP) and the like. A plurality of PDCCHs may be transmitted in a control region. A user equipment can monitor a plurality of PDCCHs. The PDCCH is transmitted on aggregation of one or more consecutive CCEs (control channel elements). In this case, the CCE is a logical assignment unit used in providing the PDCCH with a coding rate based on a radio channel state. The CCE corresponds to a plurality of REGs (resource element groups). The PDCCH format and the number of PDCCH bits are determined depending on the number of CCEs. A base station determines the PDCCH format in accordance with DCI to be transmitted to a user equipment and attaches CRC (cyclic redundancy check) to control information. The CRC is masked with an identifier (e.g., RNTI (radio network temporary identifier)) in accordance with an owner or a purpose of use. For instance, if a PDCCH is provided for a specific user equipment, CRC may be masked with an identifier (e.g., C-RNTI (cell-RNTI)) of the corresponding user equipment. If a PDCCH is provided for a paging message, CRC may be masked with a paging identifier (e.g., P-RNTI (paging-RNTI)). If a PDCCH is provided for system information (particularly, SIC (system information block)), CRC may be masked with an SI-RNTI (system information-RNTI). In addition, if a PDCCH is provided for a random access response, CRC may be masked with an RA-RNTI (random access-RNTI).

Figure 10:
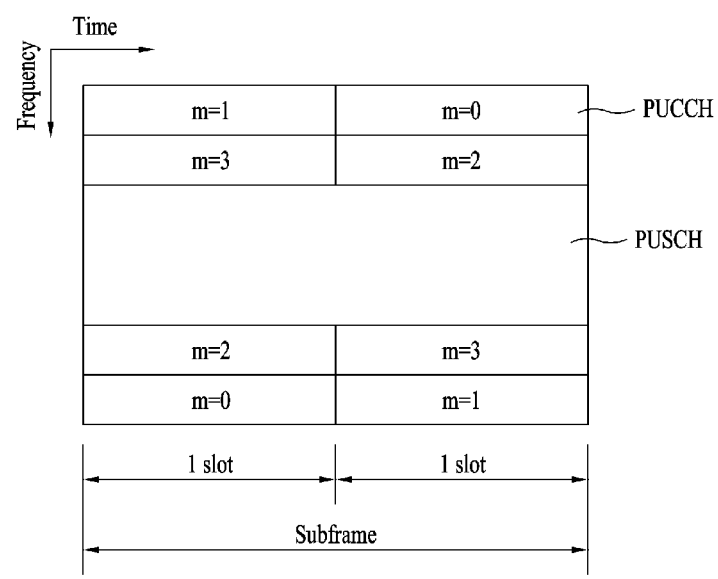
FIG. 10 illustrates a structure of an uplink subframe used in the LTE system.

FIG. 10 illustrates a structure of an uplink subframe used in the LTE system.

Referring to FIG. 10, an uplink subframe includes a plurality (e.g., 2 slots) of slots. Each of the slots may include a different number of SC-FDMA symbols depending on a length of CP. The UL subframe may be divided into a data region and a control region in the frequency domain. The data region includes a PUSCH and is used to transmit such a data signal as audio and the like. The control region includes a PUCCH and is used to transmit UCI (uplink control information). The PUCCH includes an RB pair located at both ends of the data region on a frequency axis and is hopped on a slot boundary.

The PUCCH can be used to transmit the following control information.

SR (scheduling request): This is information used to request a UL-SCH resource and is transmitted using an OOK (on-off keying) scheme.

HARQ ACK/NACK: This is a response signal in response to a DL data packet on a PDSCH and indicates whether the DL data packet has been successfully received. 1-bit ACK/NACK is transmitted as a response to a single downlink codeword and 2-bit ACK/NACK is transmitted as a response to two downlink codewords.

CSI (channel state information): This is feedback information on a downlink channel. The CSI includes a channel quality indicator (CQI). MIMO (multiple input multiple output) related feedback information includes a rank indicator (RI), a precoding matrix indicator (PMI), a precoding type indicator (PTI) and the like. 20-bit is used in each subframe.

The amount of control information (UCI) that a user equipment can transmit in a subframe depends on the number of SC-FDMA symbols available for transmission of the control information. The SC-FDMA symbols available for the transmission of the control information correspond to the rest of SC-FDMA symbols except SC-FDMA symbols used for transmitting a reference signal in the subframe. In case of a subframe in which a sounding reference signal (SRS) is configured, the last SC-FDMA symbol of the subframe is excluded from the SC-FDMA symbols available for the transmission of the control information. The reference signal is used for coherent detection of a PUCCH.

Hereinafter, D2D (UE-to-UE) communication will be described.

D2D communication schemes can be mainly divided into a scheme supported by a network/coordination station (e.g., base station) and a scheme not supported by the network/coordination station.

Figure 11:
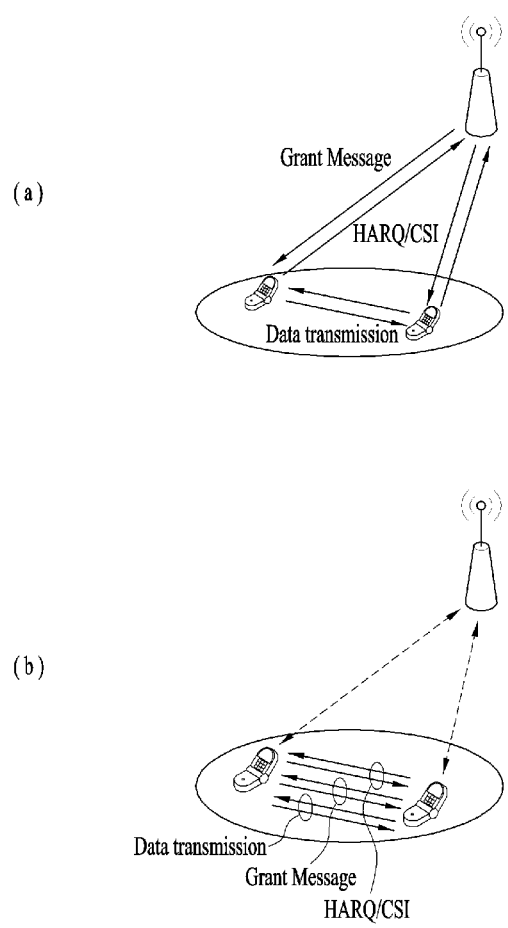
FIG. 11 is a reference diagram for explaining D2D (UE-to-UE) communication.

Referring to FIG. 11, FIG. 11(a) illustrates a scheme in which the network/coordination station intervenes in transmission and reception of control signals (e.g., grant message), HARQ, channel state information, etc. and user equipments that perform D2D communication transmit and receive data only. On the other hand, FIG. 11(b) illustrates a scheme in which the network provides minimum information (e.g., D2D connection information available in a corresponding cell) only but the user equipments that perform D2D communication establish links and transceive data.

Figure 12:
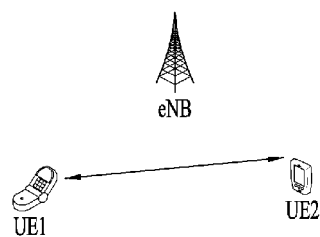
FIG. 12 is a reference diagram for explaining scenarios where D2D communication is performed.

As shown in FIG. 12, a UE can directly communicate with another UE through a radio channel (hereinafter, communication between UEs is named "device-to-device (D2D) communication"). In the present invention, a method for configuring a period of a synchronization signal associated with D2D communication (i.e., D2D synchronization signal (D2DSS)) (and/or a physical D2D synchronization channel (PD2DSCH)) is proposed. Here, although a UE means a user's terminal, a network entity such as an eNB may be regarded as the UE to which the present invention can be applied if the network entity transmits/receives signals according to a communication method between UEs. Moreover, in this specification, a D2DSS may be one of a primary sidelink synchronization signal (PSSS) and a secondary sidelink synchronization signal (SSSS). However, the two signals are commonly called the D2DSS for convenience of description.

In addition, a PD2DSCH may mean a physical sidelink broadcast channel in the specification. Thus, the PD2DSCH may carry information necessary for a UE to transmit the D2DSS, i.e., information on synchronization reference. The synchronization reference information may include a bandwidth for D2D communication, a TDD-configuration, a frame number used for D2DSS or D2DSCH transmission, a subframe number used for D2DSS or D2DSCH transmission, information indicating whether a UE is within network coverage.

Moreover, for convenience of description, the present invention is described based on the 3GPP LTE system. However, the present invention can be extensively applied to other systems as well as the 3GPP LTE system.

Furthermore, the embodiments of the present invention can be extensively applied to i) a case where among D2D UEs participating in D2D communication, some D2D UEs are within network coverage and the remaining D2D UEs are out of the network coverage (i.e., D2D Discovery/Communication of Partial Network Coverage), ii) a case where all D2D UEs participating in the D2D communication are within the network coverage (i.e., D2D Discovery/Communication Within Network Coverage), and/or iii) a case where all D2D UEs participating in the D2D communication are out of the network coverage (i.e., D2D Discovery/Communication Outside Network Coverage (for Public Safety Only)).

As an embodiment of the present invention, it may be defined that a D2DSS period (hereinafter named "D2DSS_PER") is configured according to at least one (some or all) of the following options #1 to #4. In addition, the embodiments of the present invention can be extensively applied not only when the D2DSS_PER is configured but also when a period of at least one of i) a PD2DSCH, ii) a D2D data channel, iii) an SA channel, and iv) a discovery channel (hereinafter named "DIS_SIG") is configured.

Option #1: According to the present invention, the D2DSS_PER can be defined to have configurability. In this case, the D2DSS_PER may be defined to have one (e.g., 40 or 80 ms) of period candidate values of at least one of i) the SA channel, ii) the D2D data channel, and iii) the DIS_SIG as its candidate value. As another example, the D2DSS_PER may be defined to have period candidate values of the DIS_SIG as its candidate value.

Option #2: A D2D UE can be defined to assume that when D2D communication is performed, a minimum D2DSS_PER is configured.

In other words, in case the option #2 is applied, if a D2DSS_PER is longer than the minimum D2DSS_PER, it may be determined that D2D communication is not performed with the D2DSS_PER. In addition, when a D2D UE is out of coverage (hereinafter such an out-of-coverage D2D UE is referred to as an OOC D2D UE), the OOC D2D UE may also be defined to make the above determination. This is because since the OOC D2D UE does not have synchronization reference from a base station (eNB), the D2DSS_PER longer than the minimum D2DSS_PER may cause a problem in terms of D2D communication performance Option #3: If a D2DSS_PER is defined or assumed as a minimum D2DSS_PER, a PD2DSCH may be defined to be transmitted. In this case, the PD2DSCH may be transmitted with or without a D2DSS in one subframe. However, the present invention is not limited thereto.

In addition, when a D2DSS_PER is longer than the minimum D2DSS_PER, the PD2DSCH transmission may be dropped. This is because since it is expected that the D2DSS_PER longer than the minimum D2DSS_PER will be used for DIS_SIG or in-network D2D communication, information on the PD2DSCH can be transmitted through network signaling.

Option #4: If a D2DSS_PER is equal to the minimum D2DSS_PER, it may be defined that a plurality of D2DSS resources (hereinafter a D2DSS resource is named as "D2DSS_RES") are present in one period. In this case, it may also be defined that a predefined (or signaled) gap exists between two (adjacent) D2DSS_RESs. Details of the gap will be described later with reference to FIG. 13.

In addition, in case a D2DSS_PER is longer than the minimum D2DSS_PER, if a D2D UE is within the coverage (hereinafter such a D2D UE is referred to as an in-coverage D2D UE), a D2DSS_RES may be designated through the network signaling. Thus, it may be configured that only one D2DSS_RES is present in one D2DSS_PER.

Hereinafter, a D2DSS transmission method and resource configuration therefor will be described in detail. Resource allocation for D2D synchronization is performed by determining which UE to transmit a D2DSS on which resources.

First, description will be given of a method for determining a UE to transmit a D2DSS.

An eNB may instruct an RRC_CONNECTED UE to transmit a D2DSS for Type 2B discovery message. In addition, the eNB may also inform the RRC_CONNECTED UE of a D2DSS sequence to be used for Type 1 discovery through dedicated RRC signaling. That is, according to the present invention, UE-dedicated signaling can be supported for the eNB to configure transmission of a specific D2DSS by a specific UE.

Next, description will be given of a method of determining D2DSS transmission UEs when D2D sequence transmission is configured using an SIB. In the present invention, a method based on D2DSS signal strength for UEs out of coverage (hereinafter such a UE is referred to as an out-of-coverage UE) is described.

A D2DSS used as the synchronization reference for UEs within coverage (hereinafter such a UE is referred to as an in-coverage UE) may always be PSS/SSS of a serving cell. Thus, based on the agreement that "an out-of-coverage UE can become a D2D synchronization source if received signal strength of all D2DSS(s) received by the UE is equal to or less than X dBm", the present invention proposes that "an in-coverage UE can become a D2D synchronization source if RSRP of the serving cell is equal to or less than X dBm".

Here, the threshold X dBm may be configured by the eNB and it may be applied only to cell edge UES that transmit D2DSSs.

To maintain the number of synchronization references at an acceptable level for the out-of-coverage UE, the following conditions may be applied to a UE that does not detect any D2DSSs.

The in-coverage UE may transmit a specific D2DSS sequence in at least one of the following cases: i) if it is configured by the eNB to transmit the D2DSS sequence through dedicated RRC signaling and ii) if the D2DSS sequence is configured using the SIB and the RSRP of the serving cell is less than a threshold configured by the serving cell.

Hereinafter, a method for determining resources for D2DSS transmission is described.

An out-of-coverage UE uses periodically configured (or occurring) synchronization resources for D2DSS transmission and reception. In the partial coverage scenario, the out-of-coverage UE sometimes needs to be synchronized to D2DSSs transmitted from in-coverage UEs. This means that D2D synchronization resources preconfigured for the out-of-coverage UE should appear only in D2D subframes from the perspective of the network.

In the case of the TDD, if subframe #n is an uplink subframe, it is guaranteed that subframe #n+10 is also an uplink subframe. Thus, it is preferred to configure D2D synchronization resources to have the structure where a gap between two synchronization resources is a multiple of 10 ms.

Figure 13:
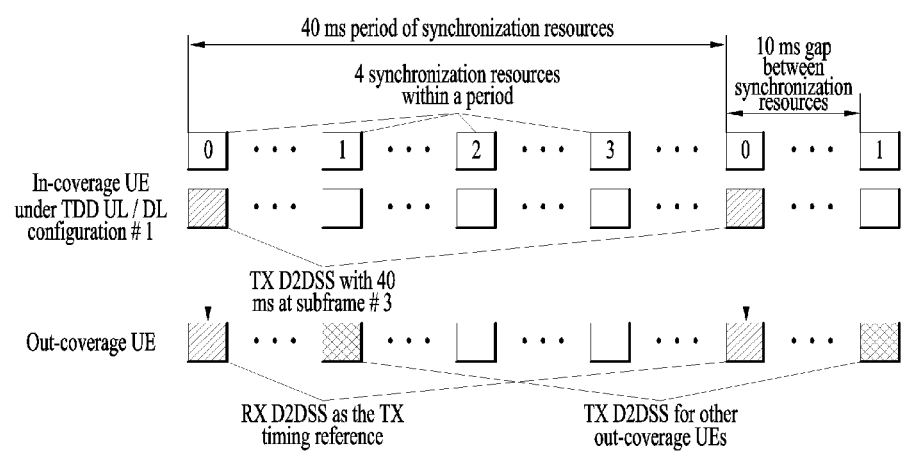
FIG. 13 illustrates an embodiment of using D2D synchronization resources when among D2D UEs participating in D2D communication, some D2D UEs are within network coverage and the remaining D2D UEs are out of the network coverage.

FIG. 13 illustrates a case in which a synchronization resource period is 40 ms and 4 resources occur with 10 ms gap within one period. In FIG. 13, an in-coverage UE is connected to a TDD cell having UL-DL configuration #1 and has 40 ms period. In this case, subframe #3 where D2DSS transmission is configured is denoted as synchronization resource #0. When an out-of-coverage UE is synchronized to a D2DSS transmitted from the in-coverage UE, the out-of-coverage UE transmits its D2DSS using (next) synchronization resource #1 for other out-of-coverage UEs that fail to receive the D2DSS from the in-coverage UE. In this case, the out-of-coverage UE performs the D2DSS transmission on subframe #3, which is an uplink subframe. Thus, the D2DSS does not cause any interference to downlink reception at the in-coverage UE.

In consideration of the above fact, D2D synchronization resources may be configured to occur with a gap of 10 ms gap according to the present invention.

The following description will be given of a timing offset between a D2DSS transmission resource and a D2DSS reception resource. For an independent synchronization source (ISS) which is a UE that fails to obtain its transmission timing from PSS/SSS or other UE's D2DSSs, the D2DSS transmission resource may be randomly selected. The resource selection may not affect the performance because WAN or D2D is not performed during a proximity of the ISS.

In order for a UE synchronized to a D2DSS transmitted from another UE to avoid potential D2DSS resource collision, deterministic resource selection for D2DSS transmission may be applied to a non-ISS UE.

Figure 14:
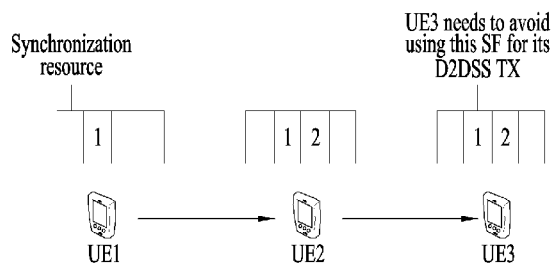
FIG. 14 illustrates a case in which synchronization resource selection is performed according to the present invention to avoid inter-D2DSS interference.

FIG. 14 illustrates a case in which the deterministic resource selection is applied. Referring to FIG. 14, there are four synchronization resources in each period. In addition, UE1 may transmit a D2DSS on resource #1 in accordance with eNB's configuration or become an ISS. UE2 receives the D2DSS from UE1 on the resource #1 and selects it as its transmission timing reference. At the same time, the UE2 transmits a D2DSS on resource #2.

Thereafter, UE3 which is synchronized with the UE2 transmits its D2DSS. If the UE3 selects the resource #1 which is already used for UE1's D2DSS transmission, such D2DSSs will collide with each other at the UE2, whereby synchronization performance of the UE2 is degraded.

Thus, a method for avoiding synchronization resource collision is necessary. The simplest way is to use a resource next to the synchronization resource, which is used to transmit the synchronization reference.

In other words, if a UE is synchronized to a D2DSS received on resource #n, the UE may select resource #((n+1) mod N) for its D2DSS transmission when the UE becomes a synchronization source, where N indicates the number of synchronization resources in a period.

The above operation is independent of whether the synchronization procedure is hierarchical with the use of a stratum level or flat with no use of the stratum level.

In addition, such a D2DSS selection procedure is necessary only for out-of-coverage UEs because the eNB informs in-coverage UEs of resources used for D2DSS transmission.

When an out-of-coverage UE is synchronized to the D2DSS received on the resource #n, the out-of-coverage UE may select the resource #((n+1) mod N) as its D2DSS transmission resource, where N is the number of synchronization resources in a period.

Each of the aforementioned embodiments/configurations/rules of the present invention can be interpreted/applied/embodied independently. In addition, it is possible to implement each of the aforementioned embodiments not only independently but also by combining/merging at least one of the embodiments.

In addition, the aforementioned embodiments of the present invention may be configured to be limitedly applied to the TDD system (for example, a case in which a D2D UE in eNB coverage of the TDD system intends to transmit a D2DSS to a D2D UE out of the eNB coverage of the TDD system).

Moreover, the aforementioned embodiments of the present invention may be configured to be limitedly applied to at least one of i) a D2DSS period configuration, ii) a PD2DSCH period configuration, iii) a D2D data channel period configuration, iv) an SA channel period configuration, and iv) a DIS_SIG period configuration.

Figure 15:
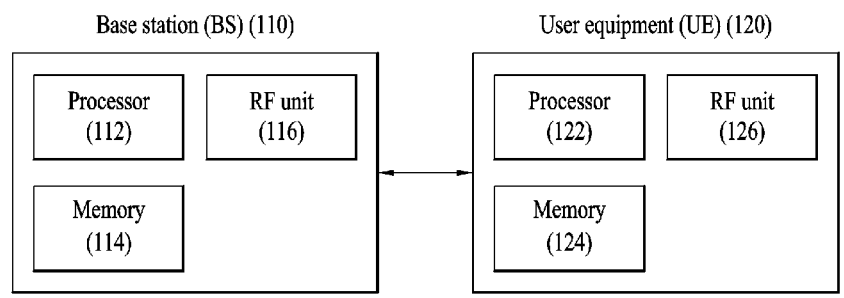
FIG. 15 illustrates a base station and a user equipment applicable to one embodiment of the present invention

FIG. 15 is a diagram of a base station and a user equipment applicable to one embodiment of the present invention.

If a relay node is included in a wireless communication system, communication in a backhaul link is performed between a base station and the relay node and communication in an access link is performed between the relay node and a user equipment. Therefore, the base station or user equipment shown in the drawing can be substituted with the relay node in some cases.

Referring to FIG. 15, a wireless communication system includes a base station (BS) 110 and a user equipment (UE) 120. The base station 110 includes a processor 112, a memory 114 and an RF (radio frequency) unit 116. The processor 112 can be configured to implement the procedures and/or methods proposed in the present invention. The memory 114 is connected to the processor 112 and stores various kinds of information related to operations of the processor 112. The RF unit 116 is connected to the processor 112 and transmits and/or receives radio or wireless signals.

The user equipment 120 includes a processor 122, a memory 124 and an RF unit 126. The processor 122 can be configured to implement the procedures and/or methods proposed in the present invention. The memory 124 is connected to the processor 122 and stores various kinds of information related to operations of the processor 122. The RF unit 126 is connected to the processor 122 and transmits and/or receives radio or wireless signals. The base station 110 and/or the user equipment 120 can have a single antenna or multiple antennas.

The above-described embodiments may correspond to combinations of elements and features of the present invention in prescribed forms. And, it may be able to consider that the respective elements or features may be selective unless they are explicitly mentioned. Each of the elements or features may be implemented in a form failing to be combined with other elements or features. Moreover, it may be able to implement an embodiment of the present invention by combining elements and/or features together in part. A sequence of operations explained for each embodiment of the present invention may be modified. Some configurations or features of one embodiment may be included in another embodiment or can be substituted for corresponding configurations or features of another embodiment. And, it is apparently understandable that a new embodiment may be configured by combining claims failing to have relation of explicit citation in the appended claims together or may be included as new claims by amendment after filing an application.

In this disclosure, a specific operation explained as performed by a base station can be performed by an upper node of the base station in some cases. In particular, in a network constructed with a plurality of network nodes including a base station, it is apparent that various operations performed for communication with a user equipment can be performed by a base station or other network nodes except the base station. In this case, 'base station' can be replaced by such a terminology as a fixed station, a Node B, an eNodeB (eNB), an access point and the like.

The embodiments of the present invention may be implemented using various means. For instance, the embodiments of the present invention may be implemented using hardware, firmware, software and/or any combinations thereof. In case of the implementation by hardware, one embodiment of the present invention may be implemented by at least one of ASICs (application specific integrated circuits), DSPs (digital signal processors), DSPDs (digital signal processing devices), PLDs (programmable logic devices), FPGAs (field programmable gate arrays), processor, controller, microcontroller, microprocessor and the like.

In case of the implementation by firmware or software, one embodiment of the present invention may be implemented by modules, procedures, and/or functions for performing the above-explained functions or operations. Software code may be stored in a memory unit and may be then driven by a processor.

The memory unit may be provided within or outside the processor to exchange data with the processor through the various means known to the public.

It will be apparent to those skilled in the art that the present invention can be embodied in other specific forms without departing from the spirit and essential characteristics of the invention. Thus, the above embodiments are to be considered in all respects as illustrative and not restrictive. The scope of the invention should be determined by reasonable interpretation of the appended claims and all change which comes within the equivalent scope of the invention are included in the scope of the invention.

INDUSTRIAL APPLICABILITY

Although a method for transmitting a synchronization signal for device-to-device (D2D) communication in a wireless communication system and device therefor are mainly described with reference to examples applied to the 3GPP LTE system, the method and device can be applied to various kinds of wireless communication systems as well as the 3GPP LTE system.

What is claimed is:

1. A method for transmitting a device-to-device (D2D) synchronization signal (SS) by a first user equipment (UE) in a wireless communication system, the method comprising:
receiving information related to a plurality of D2DSS candidate periods, wherein each of the D2DSS candidate periods is different from each other;
determining whether to perform a D2D communication with a second UE,
wherein the first and the second UEs are out-of-coverage UEs;
based on the determination to perform the D2D communication with the second UE:
receiving a first D2DSS from an in-coverage UE during a shortest period among the D2DSS candidate periods; and
transmitting a second D2DSS during the shortest period,
wherein the first D2DSS is received via a D2DSS resource #n among D2DSS resources included in the shortest period,
wherein the second D2DSS is transmitted via a D2DSS resource #n+1 among the D2DSS resources, and
wherein a gap is located between the D2DSS resource #n and the D2D resource #n+1.

2. The method of claim 1, wherein the shortest period is 40 ms.

3. The method of claim 1, wherein each of the D2DSS candidate periods is related to a scheduling assignment channel, a D2D data channel, or a discovery channel.

4. The method of claim 1, further comprising:
transmitting a D2D Shared Channel (D2DSCH) in a subframe in which the D2DSS is transmitted based on the shortest period.

5. A first user equipment (UE) for transmitting a device-to-device (D2D) synchronization signal (SS) in a wireless communication system, the first UE comprising:
a transmitter and receiver; and
a processor, operatively coupled to the transmitter and receiver,
wherein the processor is configured to:
control the receiver to receive information related to a plurality of D2DSS candidate periods, wherein each of the D2DSS candidate periods is different from each other;
determine whether to perform a D2D communication with a second UE,
wherein the first and the second UEs are out-of-coverage UEs;
based on the determination to perform the D2D communication with the second UE:
control the receiver to receive a first D2DSS from an in-coverage UE during a shortest period among the D2DSS candidate periods; and
control the receiver to transmit a second D2DSS during the shortest period,
wherein the first D2DSS is received via a D2DSS resource #n among D2DSS resources included in the shortest period,
wherein the second D2DSS is transmitted via a D2DSS resource #n+1 among the D2DSS resources, and
wherein a gap is located between the D2DSS resource #n and the D2D resource #n+1.

6. The first UE of claim 5, wherein the shortest period is 40 ms.

7. The first UE of claim 5, wherein each of the D2DSS candidate periods is related to a scheduling assignment channel, a D2D data channel, or a discovery channel.

8. The first UE of claim 5, wherein the processor is further configured to:
control the transmitter to transmit a D2D Shared Channel (D2DSCH) in a subframe in which the D2DSS is transmitted based on the shortest period.

* * * * *